United States Patent
LeMense et al.

(10) Patent No.: US 6,265,988 B1
(45) Date of Patent: Jul. 24, 2001

(54) APPARATUS AND METHOD FOR REMOTE CONVENIENCE MESSAGE TRANSMISSION AND CONTROL UTILIZING FREQUENCY DIVERSITY

(75) Inventors: Thomas John LeMense, Livonia; Tejas Bhupendra Desai, Sterling Heights, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/055,830

(22) Filed: Apr. 6, 1998

(51) Int. Cl.[7] .................................................. G08C 19/00
(52) U.S. Cl. .................. 340/825.69; 455/273; 340/426; 714/747
(58) Field of Search .................. 342/42; 340/825.31, 340/825.69, 426, 10.41, 825.41, 5.6, 5.61–5.65; 331/1 A; 455/273, 59, 101; 714/747

(56) References Cited

U.S. PATENT DOCUMENTS

| | | | |
|---|---|---|---|
| 3,959,737 | * 5/1976 | Tanis | 331/1 A |
| 4,616,364 | 10/1986 | Lee | 375/1 |
| 4,644,347 | 2/1987 | Lucas et al. | 340/825.04 |
| 5,142,691 | 8/1992 | Freeburg et al. | 455/38.2 |
| 5,303,259 | 4/1994 | Loveall | 375/1 |
| 5,347,280 | * 9/1994 | Schuermann | 342/42 |
| 5,369,800 | * 11/1994 | Takagi et al. | 455/59 |
| 5,404,374 | 4/1995 | Mullins et al. | 375/200 |
| 5,428,818 | 6/1995 | Meidan et al. | 455/33.3 |
| 5,437,060 | 7/1995 | Delamater et al. | 455/63 |
| 5,438,699 | 8/1995 | Coveley | 455/64.4 |
| 5,452,319 | 9/1995 | Cook et al. | 375/202 |
| 5,499,388 | 3/1996 | Song | 455/62 |
| 5,507,020 | 4/1996 | Lee | 455/137 |
| 5,543,776 | * 8/1996 | L'Esperance et al. | 340/426 |
| 5,585,780 | 12/1996 | Sakashita | 340/432 |
| 5,619,191 | 4/1997 | Lambropoulos | 340/825.69 |

* cited by examiner

Primary Examiner—Michael Horabik
Assistant Examiner—M Shimizu
(74) Attorney, Agent, or Firm—Tarolli, Sundheim, Covell, Tummino & Szabo L.L.P.

(57) ABSTRACT

A remote convenience system (10) includes a portable transmitter unit (14) and a receiver unit (18), and by a method, permits remote control of performance of a function, via a signal (16). Preferably, the system (10) is a remote convenience system for a vehicle (12). The transmitter unit (14) has a microcomputer (90) that provides a message that contains a function request. First and second signals are transmitted from the transmitter unit (14). Each signal is provided by a transmitter portion (70) at a different frequency and conveys the complete message. The receiver unit (18) has a detector (e.g., 190) tuned to receive the signal (16) for both the first and second frequencies, and can discern the complete message provided via both frequencies or either frequency. Thus, if the transmitter unit (14) is in a frequency dependent "dead spot", communication is not prevented.

2 Claims, 4 Drawing Sheets

APPARATUS AND METHOD FOR REMOTE CONVENIENCE MESSAGE TRANSMISSION AND CONTROL UTILIZING FREQUENCY DIVERSITY

FIELD OF THE INVENTION

The present invention relates to remote convenience systems, and is particularly directed to a system which includes a remote transmitter for transmitting a message to cause a function, such as a vehicle location alerting function (e.g., "vehicle finder" function), to be performed.

BACKGROUND OF THE INVENTION

Remote convenience systems are known in the art. Such remote convenience systems permit remote control of certain functions. One example type of a remote convenience system is for remotely controlling vehicle functions. Other example types of remote convenience systems include garage door opener systems and entry light activation systems.

Focusing now on the remote convenience vehicle systems, examples of a remotely controlled functions include locking and unlocking of one or more vehicle doors. A remote convenience vehicle system that permits remote locking and unlocking functions is commonly referred to as a remote keyless entry system.

Such remote convenience vehicle systems may provide for control of other vehicle functions. For example, a remote vehicle locator function may be provided. The vehicle locator function causes the vehicle horn to emit a horn chirp and/or the headlights of the vehicle to flash "ON". This allows a person to quickly locate their car within a crowded parking lot.

Known remote convenience vehicle systems include a receiver mounted in an associated vehicle and at least one portable hand-held transmitter located remote from the receiver. The receiver has a memory that stores one or more security codes, each of which is associated with a transmitter that is authorized to cooperate with the receiver mounted in the vehicle. Each transmitter is provided with one or more manually actuatable switches. Each switch is associated with a vehicle control function to be performed. The transmitter includes circuitry that responds to the actuation of one of its switches to transmit a message in the form of a digital signal. The transmitted digital signal also includes the appropriate security code. When the receiver receives such a digital signal, it compares the security code portion of the received signal against its stored security code, and, if a match is found, the receiver provides the received message to an actuation controller, which, in turn, directs performance the requested function.

The portable transmitters operate in the ultra high frequency ("UHF") portion of the radio frequency ("RF") spectrum. Specifically, the remote transmitters operate in the portion of the RF spectrum that is allocated by the Federal Communication Commission ("FCC") for unlicensed transmission devices. FCC regulations stipulate that such unlicensed devices can not have a transmitted signal strength that exceeds a stipulated maximum value.

It is desirable to have a system which will provide consistent performance within a certain range. However, one problem associated with the UHF band is that of multipath interference. This problem manifests itself as "dead spots" inside of what would otherwise be a distance at which the system is capable of operating. These "dead spots" are caused by destructive interference and their location relative to the point of transmission are (i) frequency (i.e., wavelength) dependent and (ii) strength of signal dependent. Because the FCC regulates the transmitted signal strength, transmission power cannot merely be increased to overcome the interference and, thereby, obviate the problem of dead spots.

Further, it is often desirable to accomplish remote control performance of certain functions at a longest possible distance. One example is the remote vehicle locator function. To illustrate such a scenario, consider a shopping mall patron exiting a shopping mall building and being faced with the task of visually locating their car within a vast shopping mall parking lot. It would be beneficial to be able to actuate the remote vehicle locator function from a location near the exit door of the shopping mall, before proceeding into the parking lot.

SUMMARY OF THE INVENTION

In accordance with the present invention, a portable transmitter apparatus is provided for use in a remote convenience system. The remote convenience system has a receiver/controller unit responsive to a function request transmitted by the transmitter for controlling performance of a function. The apparatus includes means for providing a message that contains a function request. Means transmits a first signal that conveys the message using a first frequency. Means transmits a second signal that conveys the same message using a second frequency. The second frequency is different from the first frequency.

In accordance with other aspect, the present invention provides a remote convenience system for remote control of performance of a function. The system includes portable transmitter means for remote control requests. The transmitter means includes means for providing a message that contains a function request. The transmitter means includes means for transmitting a first signal that conveys the message using a first frequency. The transmitter means includes means for transmitting a second signal that conveys the same message using a second frequency. The second frequency is different from the first frequency. The system includes receiver/controller means for receiving the remote control requests and for controlling performance of the requested function. The receiver/controller means includes means for receiving at least a portion of the first signal and means for receiving at least a portion of the second signal. The receiver/controller means includes means for discerning at least a portion of the message from the first signal and means for discerning at least a portion of the message from the second signal.

In accordance with yet another aspect, the present invention provides a method for conveying a remote function request from a portable transmitter apparatus of a remote convenience system to a receiver/controller unit that is responsive to such a function request from the transmitter apparatus. A message is provided that contains a function request. A first signal conveying the message is transmitted using a first frequency. A second signal conveying the same message is transmitted using a second frequency. The second frequency is different from the first frequency.

In accordance with yet another aspect, the present invention provides a method of remote controlling performance of a function with a system having portable transmitter means for remote control requests and receiver/controller means for receiving remote control requests. A message is provided in the transmitter means that contains a function request. A first signal containing the message is transmitted using a first frequency. A second signal containing the same message is transmitted using a second frequency. The second frequency is different from the first frequency. At least portions of the first and second signals are received at the receiver/ controller means. The complete message is discerned from the received portions of the first and second signals. The performance of the requested function is controlled in response the message.

BRIEF DESCRIPTION OF THE DRAWINGS

The foregoing and other features and advantages of the present invention will become apparent to those skilled in the art to which the present invention relates from a reading of the following detailed description of preferred embodiments with reference to the accompanying drawings in which.

DESCRIPTION OF PREFERRED EMBODIMENTS

Figure 1:
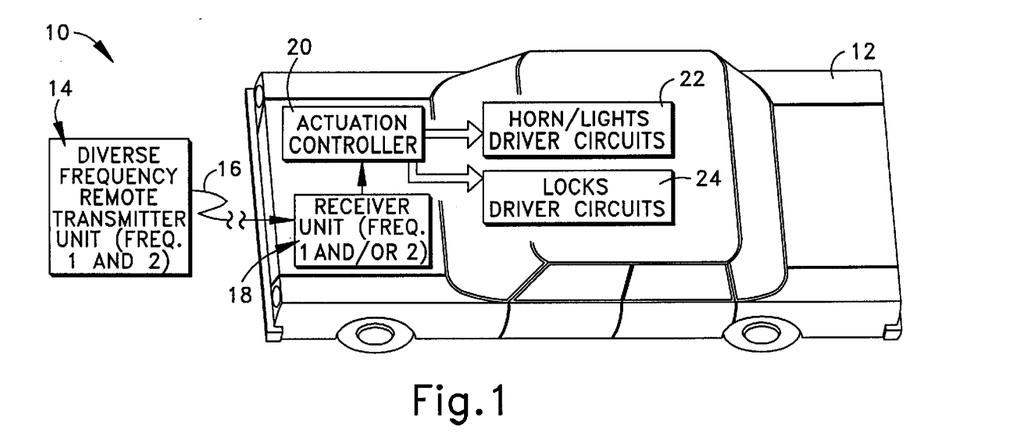
FIG. 1 is a schematic illustration of a remote convenience vehicle system, in accordance with the present invention, associated with a vehicle.

One preferred embodiment of a remote convenience vehicle system 10 in accordance with the present invention is schematically shown in FIG. 1, along with an associated vehicle 12. The system 10 includes one or more remote transmitter units 14 that communicate, via a signal 16, with a vehicle-mounted receiver unit 18 to achieve remote control of at least one vehicle system.

Preferably, each transmitter unit 14 transmits several command signals 16 to the receiver unit 18. Each command signal contains a message that requests performance of a certain function. Upon receipt of an authorized command signal 16 by the receiver unit 18, the receiver unit provides a function request message to an actuation controller 20. The actuation controller 20, in turn, controls the vehicle components associated with the requested function. In the example illustrated in the figures, the controllable vehicle components include horn/lights driver circuits 22 and door locks driver circuits 24.

Upon actuation of the horn/lights driver circuits 22, the vehicle horn emits an audible signal (e.g., a short duration horn note known as a horn chirp) and/or the vehicle head lights "flash" on (e.g., a short duration "ON" state). In one example, the audible sounding of the vehicle horn and/or the visual flash of the vehicle headlights is a remote vehicle locate function, to alert the transmitter operator (e.g., the vehicle owner, not shown) as to the location of the vehicle 12. In another example (not shown), the horn sounding and light flashing is a personal security or "panic" function, as will be understood by a person of ordinary skill in the art.

Upon actuation of one or more of the door lock driver circuits 24, the associated door(s) are appropriately locked/ unlocked. It will be appreciated that the present invention can be employed for systems that have other remote control functions (e.g., trunk release). Also, it will be appreciated that other embodiments of the present invention may have other remotely controlled functions (e.g., garage door opening, or entry light activation).

The transmitter unit 14 (FIG. 2) is, in accordance with one embodiment of the present invention, a portable, handheld unit that has a housing 28, which encloses its electronic components. Typically, the transmitter unit 14 is of a size that allows its attachment to a key chain, via a key chain attachment ring 30.

Figure 2:
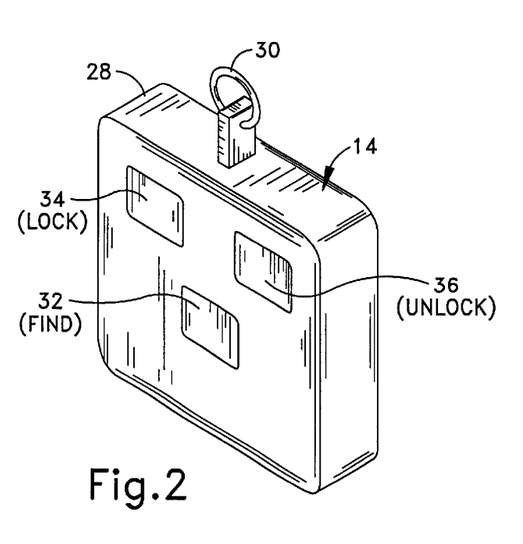
FIG. 2 is a perspective view of an example transmitter housing of a remote transmitter unit of FIG. 1.

The transmitter unit 14 includes at least one manually operable pushbutton switch. In the example shown in the figures, there are three pushbutton switches 32–36. A first one 32 of the pushbutton switches is associated with the remote vehicle locate or "find" function (e.g., short horn sound/lights flash). A second one 34 of the pushbutton switches is associated with the vehicle doors lock function (e.g., remote actuation of the locks driver circuits 24 to lock the doors). A third one 36 of the pushbutton switches is associated with the vehicle doors unlock function (e.g., remote actuation of the locks driver circuits 24 to unlock one or more of the vehicle doors).

Figure 3:
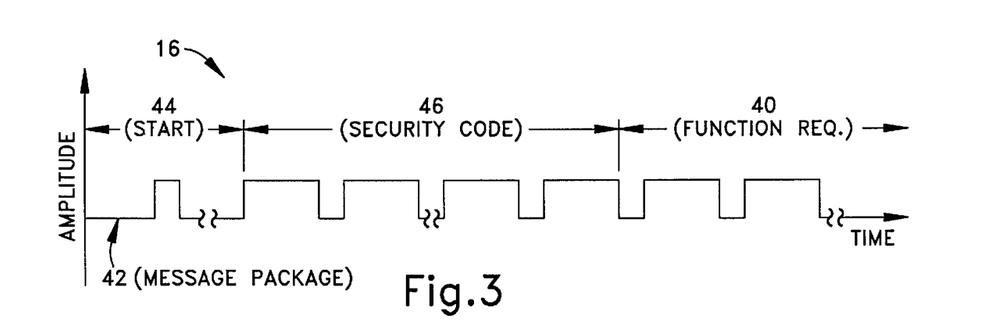
FIG. 3 is an illustration of a waveform showing a message package of a transmitted signal.

Each actuation, or predefined series of actuations, of one of the pushbuttons of the transmitter unit 14 corresponds to a predefined remote function request. Each function request (FIG. 3) is sent out as a message part 40 of a transmitted message package 42 conveyed by the transmitted signal 16. Preferably, the overall transmitted message package 42 also includes a start or initiation portion 44 and a security code portion 46.

Figure 4A:
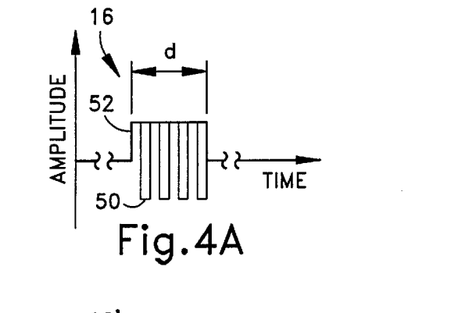
FIG. 4A is an illustration of a signal portion at a first frequency.

The signal 16 is preferably a serially transmitted, digital signal. Further, the signal 16 preferably has a plurality of carrier-frequency pulses. Each pulse 52 is comprised of an oscillating frequency 50 that is "ON" for a controlled time period to represent a binary one or zero. Specifically, as shown in FIG. 4A, the signal 16 is steady state outside of a pulse 52 and oscillates within the pulse. Preferably, the frequency 50 of the oscillation is in the radio frequency range. Binary one and binary zero are distinguished from each other by a difference in pulse length or duration "d" during the ON 52 portion of the signal.

A signal 16 (FIG. 1) transmitted from the transmitter unit 14 can be subject to outside interference. The interference is frequency dependent, and may prevent communication even if the transmitter unit 14 is within a normal range of the receiver unit 18. When the transmitter unit 14 is at a location where such interference prevents communication, the location is referred to as a "dead spot". In order to alleviate the problem of dead spots, the system 10, in accordance with the present invention, includes the transmitter unit 14 that transmits the entire message package 42 using two different frequencies (e.g., a first frequency and a second frequency). Further, the system 10, in accordance with the present invention, includes the receiver unit 18 that can receive the message-containing signal 16 of either frequency.

Figure 4B:
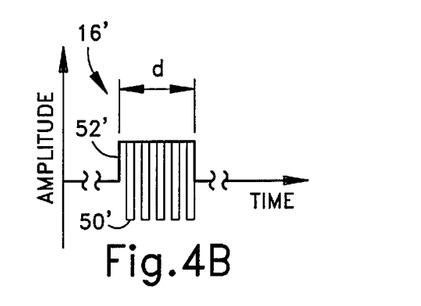
FIG. 4B is similar to FIG. 4A, but shows a second frequency.

In one embodiment of the system 10, the frequency 50 (FIG. 4A) is changed, and the complete message package is retransmitted. The change in frequency is associated with the use of the first frequency, and then the use of the second frequency. For example, as shown in a comparison of FIGS. 4A and 4B, the pulse-width "d" is the same for the pulses 52 and 52'. However, the frequency 50 for the signal 16 (FIG. 4A) is different from the frequency 50' for the signal 16' (FIG. 4B).

Referring again to FIG. 1, it is intended that the receiver unit 18 receive the complete message package, as transmitted using the first frequency, and receive the complete message package, as transmitted using the second frequency. If the receiver unit 18 receives the message via both frequencies within a predetermined, relative short time period, the redundancy is merely ignored. However, if, per chance, the transmitter unit 14 is located at a dead spot for one of the frequencies, the receiver unit 18 is still likely to receive the complete message that was transmitted using the other frequency. Also, the receiver unit 18 can construct a complete message from parts transmitted using the two frequencies.

Figure 5:
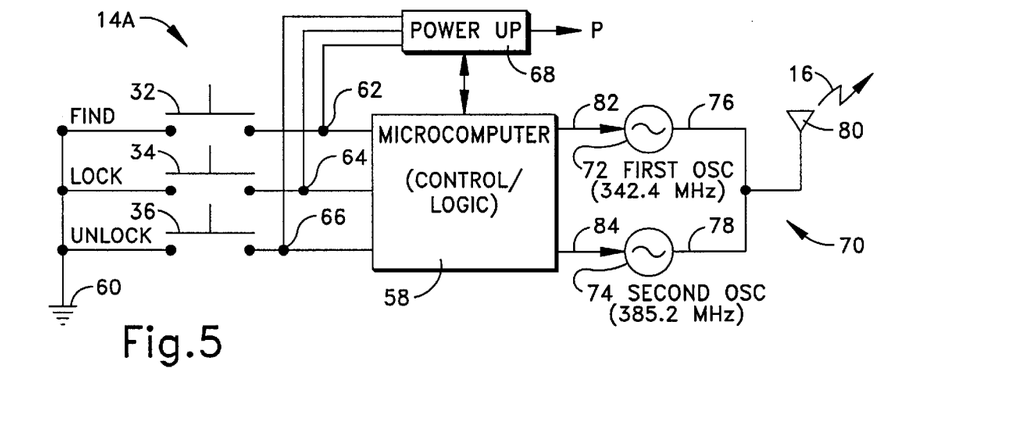
FIG. 5 is a schematic illustration of a first embodiment of the remote transmitter unit shown in FIG. 1.

Focusing now on the transmitter unit 14, a first embodiment of the transmitter unit, in accordance with the present invention, is schematically shown in FIG. 5. The transmitter unit (designated 14A), in accordance with one embodiment, includes a microcomputer 58 having associated ROMs, EEPROMs, and RAMs programmed to perform transmitter related functions of the system 10. The microcomputer 58 further includes control/logic programs for performing transmitter-related functions.

Each of the pushbutton switches 32–36 is connected between electrical ground 60 within the transmitter unit 14A and a respective control node 62–66. The control node (e.g., 62) for each pushbutton switch (e.g., 32) is connected to the microcomputer 58 and is also connected to a power-up circuit 68. The power-up circuit 68 is appropriately connected to supply power P to the microcomputer 58 and other electrical components within the transmitter unit 14A. Upon pressing one of the pushbutton switches (e.g., 32), the power-up circuit 68 is actuated to direct power P to the microcomputer 58 and to the other circuits.

In response to closure of one of the pushbutton switches (e.g., 32), the microcomputer 58 accesses an appropriate function request message from memory and also accesses the system's security code from memory. The microcomputer 58 then "assembles" the message package, which includes a security code and a function request message. The message package is held in the memory RAM of the microcomputer and is provided to a transmitter portion 70 of the transmitter unit 14A during a transmission sequence.

In the embodiment shown in FIG. 5, the transmitter portion 70 of the transmitter unit 14A includes a first oscillator 72, which provides a first transmission frequency. Preferably, the first transmission frequency is 342.4 MHz. The transmitter portion 70 includes a second oscillator 74, which provides a second, different transmission frequency. Preferably, the second transmission frequency is 385.2 MHz. The outputs 76, 78 of the first and second oscillators 72, 74 are operatively connected to a transmission antenna 80.

An input/control signal 82 from the microcomputer 58 is provided to the first oscillator 72. Similarly, an input/control signal 84 is provided to the second oscillator 74 from the microcomputer 58. The input/control signals 82 and 84 are pulse-width modulated serial signals. Each input/control signal (e.g., 82) controls (i.e., gates) the respective oscillator (e.g., 72) to provide its output signal (e.g., 76) as a gated, oscillating output signal. Specifically, each oscillator (e.g., 72) outputs a digital code signal, wherein each digital ON pulse 52 is comprised of the associated transmission frequency 50 (e.g., the first frequency FIGS. 4A and 4B).

Each of the two input/control signals (e.g., 82) that is provided by the microcomputer 58 contains a complete message package 42. Accordingly, each oscillator (e.g., 72) outputs a gated, oscillating output signal representing the complete message package 42 to the transmission antenna 80. Thus, each oscillator (e.g., 72) is associated with transmission of a complete message utilizing its associated frequency (e.g., the first frequency, 342.4 MHz) as the transmitted frequency.

Preferably, the control/logic circuitry of the microcomputer 58 provides only one of the input/control signals 82 or 84 at a time. Thus, only one of the oscillators 72 or 74 is actively outputting its gated, oscillating output signal (i.e., 76 or 78) at a time. However, for each remote function request message that is to be sent, the message is completely transmitted using the first oscillator 72 and is then completely transmitted using the second oscillator 74. For example, the controller logic circuitry provides the input/ control signal 82 to the first oscillator 72, to cause transmission of the complete message using the first frequency, and then repeats the procedure with the second oscillator 74, such that the complete message is transmitted using the second frequency.

Figure 6:
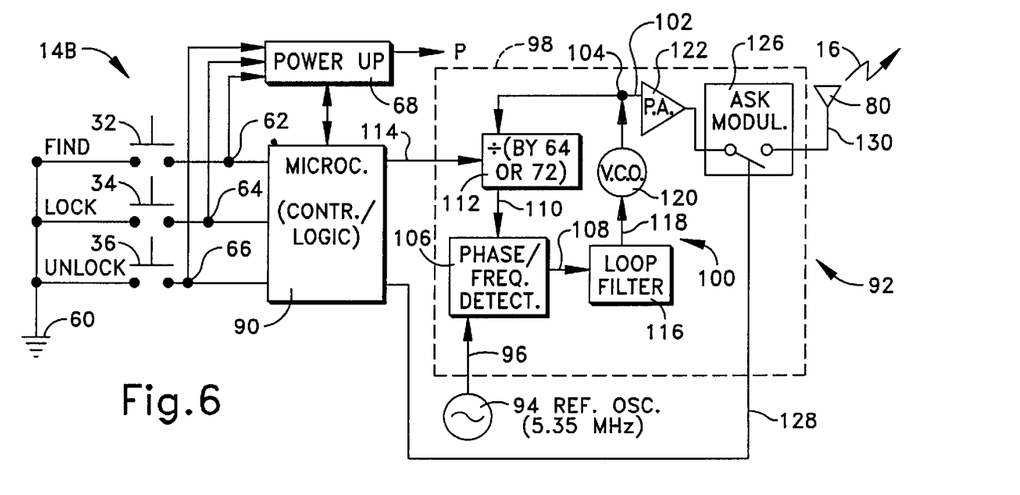
FIG. 6 is a schematic illustration of a second embodiment of the transmitter unit.

Referring to FIG. 6, a second embodiment of the transmitter unit is illustrated. The second embodiment of the transmitter unit is designated 14B and has certain structural elements, which are identical to those of the first embodiment shown in FIG. 5. These identical structural elements are identified by the same reference numerals used to identify the structure in the embodiment shown in FIG. 5. The identical structure is not further discussed in detail. The different structure of the embodiment of FIG. 6 includes its microcomputer 90 and its transmitter portion 92.

The transmitter portion 92 includes a reference oscillator 94, which preferably outputs a reference oscillator signal 96 at 5.35 MHz. The reference oscillator 94 is a precise frequency source. Also, included in the transmitter portion 92 is a radio-frequency-transmission, application-specific-integrated circuit ("ASIC") 98. The ASIC 98 has a phase-locked-loop circuit 100 that outputs an oscillating signal 102 at an output node 104. The output signal 102 is at either a first or a second frequency. Preferably, similar to the first embodiment, the first frequency is 342.4 MHz and the second frequency is 385.2 MHz.

Within the phase-locked-loop circuit 100 is a digital phase/frequency detector 106. The phase/frequency detector 106 Monitors the difference in the phase and frequency of two input signals and outputs a voltage signal 108 indicative of the difference in the phase and frequency between the two inputs. A first input to the phase/frequency detector 106 is the oscillator output signal 96 from the reference oscillator 94. The second input 110 to the phase/frequency detector 106 is from a frequency divider circuit 112.

The frequency divider circuit 112 is in a "feedback" portion of the phase-locked-loop circuit 100. The frequency divider 112 divides the frequency of a signal input thereto by a predetermined integer value. The integer value that is used within the frequency divider 112 is controlled, via a signal 114 output from the microcomputer 90. Preferably, the integer value is selectable to be either "64" and "72". The integer "64" is used when it is desired that the output signal 102 from the phase-locked-loop circuit 100 be at the first frequency, e.g., 342.4 MHz. The integer "72" is utilized to obtain the second frequency (e.g., 385.2 MHz) in the output signal 102 from the phase-locked-loop circuit 100.

In the phase-locked-loop circuit 100, the voltage signal 108 output from the phase/frequency detector 106 is input to a loop filter 116. The loop filter 116 smoothes and integrates the signal 108 and outputs a control voltage signal 118. A voltage-controlled oscillator 120 of the phase-locked-loop circuit 100 receives the control voltage signal 118. The voltage-controlled oscillator 120 provides the output signal 102 to the output node 104. The frequency of the output signal 102 is dependent upon the voltage of the control voltage signal 118.

The output node 104 is connected to the input of the frequency divider 112. The phase-locked-loop circuit 100 constantly monitors the frequency of the output signal 102 of the voltage-controlled oscillator 120, such that a precise output frequency is maintained.

The output node 104 is also connected to an input of a power amplifier 122. An output of the power amplifier 122 is supplied to an input of an amplitude shift key modulator ("ASK modulator") 126. The ASK modulator 126 acts as a gating device and is controlled by an ASK pulse-modulated data signal 128 from the microcomputer 90. The ASK data signal 128 is a series of digital pulses (e.g., pulse width modulation) which represent of the complete message package 42. The ASK data signal 128 controls the ASK modulator 126 such that the output 130 of the ASK modulator is a gated oscillating signal. This gated oscillating output signal 130 is applied to the transmission antenna 80.

Similar to the first embodiment of the transmitter shown in FIG. 5, the embodiment shown in FIG. 6 transmits a signal 16 conveying a complete message package using the first frequency and then transmits a signal 16 conveying the same complete message package using the second frequency. Specifically, in response to a pushbutton actuation, the microcomputer 90 provides the control signal 114 instructing the frequency divider 112 to use the first one of the divide by integer values, e.g., integer "64". The phase-locked-loop circuit 100 outputs its signal 102 at the first frequency (e.g., 342.4 MHz).

The microcomputer 90 outputs the serial ASK data signal 128 to control the ASK modulator 126 for the sequence of the first complete message package. A signal 16, which has the first transmission frequency and which conveys the complete message package, is transmitted from the transmitter unit 14B. Subsequently, the microcomputer 90 provides a control signal 114 to the frequency divider 112 to change the divisor integer to the second integer value, e.g., "72". The phase-locked-loop circuit 100 outputs its signal 102 at the second frequency, e.g., 385.2 MHz. The microcomputer 90 again provides the ASK data signal 128 to control the ASK module 126 for the sequence of the second complete message package. The transmitter unit 14B transmits another signal 16, using the second frequency, to again convey the complete message package.

Similar to the first embodiment, it is intended that the receiver unit 18 (FIG. 1) receive the complete message package, via the first frequency, and to again receive the complete message package, via the second frequency. However, if, per chance, the transmitter unit 14B is located in an area which would result in a "dead spot" for one of the frequencies, the receiver unit 18 is still likely to receive the complete message package, which was transmitted using the other frequency.

Figure 7:
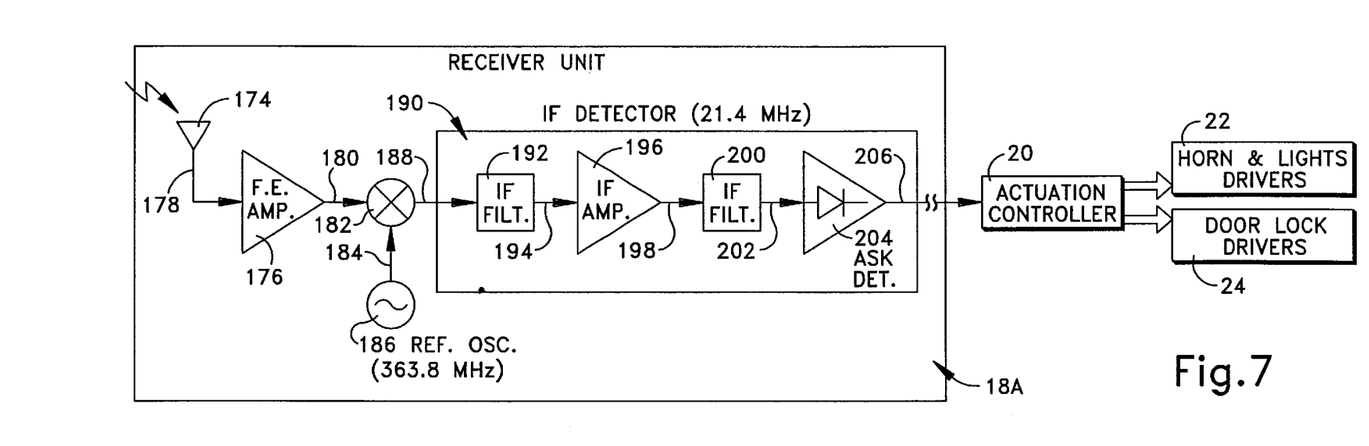
FIG. 7 is a schematic illustration of a first embodiment of a receiver unit shown in FIG. 1.

FIG. 7 illustrates a first embodiment of the receiver unit (designated 18A). The receiver unit 18A includes an antenna 174 that is coupled to provide a signal 178 to a front-end amplifier 176. The output 180 of the amplifier 176 is provided as a first input to a mixer 182. A local or reference oscillator 186 provides a second input 184 of the mixer 182.

The reference oscillator output signal 184 is an oscillating signal at a frequency equal to the average of the first and second frequencies of the system 10. Preferably, this frequency is 363.8 MHz, and is referred to as the receiver reference frequency. See FIG. 8.

The mixer 182 (FIG. 7) combines the two input signals 180, 184 and outputs a signal 188 having frequency components that are the sum and difference of the two input signals 180, 184. In other words, the mixer 182 "beats" the signal 180 with the signal 184. The "difference frequency" is termed an intermediate frequency. Specifically, in the preferred embodiment (see FIG. 8), if the received signal is at the first frequency (e.g., 342.4 MHz), the "difference" or intermediate frequency is 21.4 MHz and the "sum" frequency is 708.2 MHz.

If the signal 16 received by the receiver unit 18A (FIG. 7) is at the second frequency, the output signal 188 of the mixer 182 still includes a "difference" frequency, which is the intermediate frequency. In the preferred embodiment (e.g., the second frequency equals 385.2 MHz, see FIG. 8), the "difference" frequency is 21.4 MHz and the "sum" frequency is 749 MHz.

The output signal 188 of the mixer 182 is supplied to an intermediate frequency detector 190. Within the intermediate frequency detector 190 is a first intermediate frequency filter 192, which is a bandpass filter having a center frequency located at the intermediate frequency (e.g., 21.4 MHz). Thus, the intermediate frequency filter 192 has sufficient roll-off so that it only passes a predefined "channel" of frequency components near the difference frequency components of the signal 188.

The output 194 of the intermediate frequency filter 192 is supplied to an intermediate frequency amplifier 196. The output 198 of the amplifier 196 is supplied to a second intermediate frequency filter 200. The second intermediate frequency filter 200 is also a bandpass filter and is identical to the first intermediate frequency filter 192. Specifically, the center frequency of the bandpass is at the intermediate frequency, e.g., 21.4 MHz. The use of two intermediate frequency filters 192, 200 results in increased precision.

The output 202 of the second intermediate frequency filter 200 is provided to an amplitude shift key (ASK) detector 204. The ASK detector 204 outputs a serial digital data signal 206, which contains the complete message package. Thus, the embodiment of the receiver unit 18A shown in FIG. 7 is responsive to a gated oscillating signal 16 having a transmission frequency which is at either the first frequency, the second frequency, which contains frequency components of both the first and second frequencies.

The ASK detector output 206 is further processed within the receiver unit 18A to compare the security code, etc. Specifically, the receiver unit 18A includes suitable message processing means, such as a microcomputer (not shown) that has a plurality of associated memories including ROMs, EEPROMs, and RAMs. Within the internal memory is stored the security code for the system.

During reception of the complete message, via the signal at either one or both of the transmission frequencies, the receiver unit 18A is "awakened" by the start or initiation portion of the message package and then proceeds to decode or demodulate the security code. If the receiver unit 18A properly receives a valid security code, it decodes the portion of the message containing the vehicle function request. The vehicle function request is stored in memory RAM and, in turn, supplied to the actuation controller 20.

The actuation controller 20 controls the appropriate device driver circuit for effecting the requested vehicle function. For example, if the requested vehicle function is to perform a vehicle location operation, the actuation controller 20 causes the horn/lights driver circuits 22 to actuate the vehicle's horn and/or to cause the vehicle's headlights to flash. If the requested vehicle function is to lock/unlock the vehicle door(s), the actuation controller 20 appropriately controls locks driver circuit(s) 24 to perform the requested function.

If, per chance, the remote transmitter unit 14 is located in an area which resulted in a "dead spot" for one of the frequencies, the receiver unit is still likely to receive the complete message, via the other frequency. Also, the actuation controller 20 is capable of discerning a complete message package if one part of the complete message package is received via one of the transmission frequencies and the complement part of the complete message package is received via the other transmission frequency. The actuation controller 20 "constructs" the complete message package from the parts.

Specifically, in the situation where each of the two message packages (one via the first frequency and the other via the second frequency) has missing data bits, the two message packages are "overlaid". Because the two message packages should be identical, most of the "overlaid" data bits will match (e.g., as determined by Boolean logic AND operation).

Accordingly, these matching data bits are used in the constructed message package. When one message package is missing a data bit, the corresponding data bit from the other message package is used in the constructed message package (e.g., as determined by Boolean logic XOR operation). If each data bit is present in at least one of the two message packages, then the constructed message can be completed.

Figure 9:
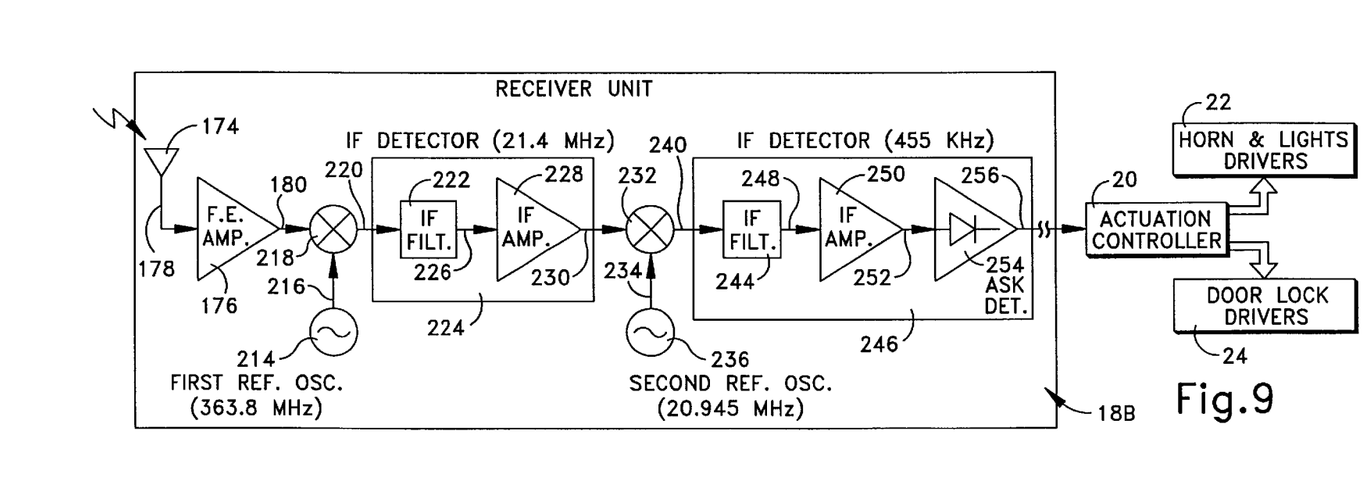
FIG. 9 is a schematic illustration of a second embodiment of the receiver unit.

Referring now to FIG. 9, a second embodiment of the receiver unit is illustrated. The second embodiment of the receiver unit is designated 18B and has certain structure identical to those of the first embodiment of FIG. 7. Specifically, the receiver unit 18B contains a reception antenna 174, a front-end amplifier 176 and message processing means (e.g., a microcomputer, not shown).

Only the different structure of the second receiver unit embodiment is discussed. Specifically, the second embodiment of the receiver unit 18B (FIG. 9) includes a first receiver reference oscillator 214. An oscillating output signal 216 of the first reference oscillator is at a first reference frequency. Preferably, the first receiver reference frequency is 363.8 MHz.

Figure 8:
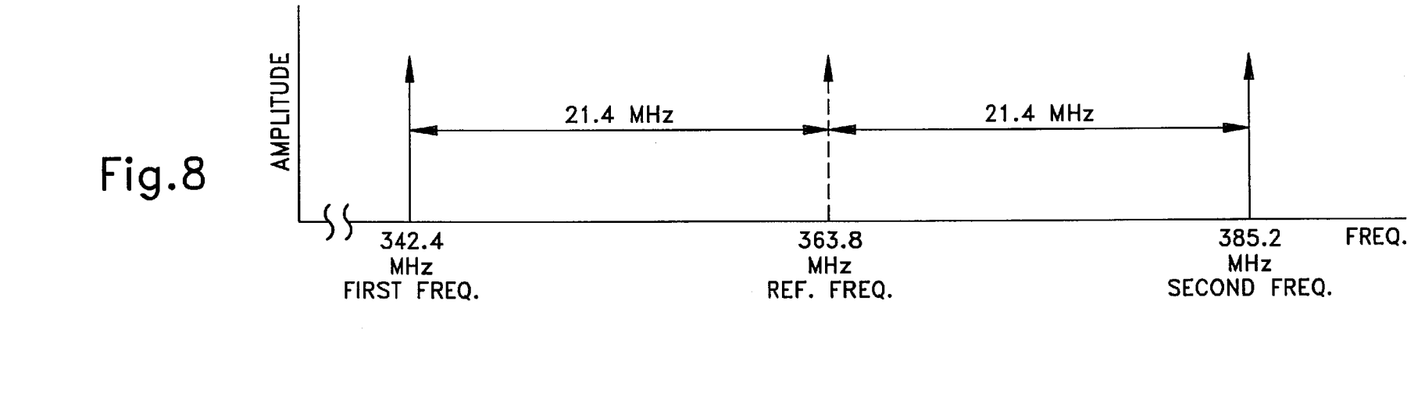
FIG. 8 is a plot illustrating an exemplary frequency plan for certain embodiments of the present invention.

A first mixer 218 of the receiver unit 18B has the signals 180 and 216 as its inputs. The first mixer 218 combines the two input signals, and outputs a signal 220 having sum and difference frequency components (i.e., the first mixer 218 "beats" the signal 180 with the signal 216). The preferred frequency relationships are as shown in FIG. 8. Specifically, in the preferred embodiment, if the received signal 16 has its transmission frequency at the first frequency (e.g., 342.4 MHz), the "difference" or intermediate frequency is 21.4 MHz and the "sum" frequency is 708.2 MHz.

If the signal 16 received by the receiver unit 18B has its transmission frequency at the second frequency, the output signal 220 of the first mixer 218 still includes a "difference" frequency which is the intermediate frequency. In the preferred embodiment (e.g., the second frequency equals 385.2 MHz), the "difference" frequency is 21.4 MHz and the "sum" frequency is 749 MHz.

Figure 10:
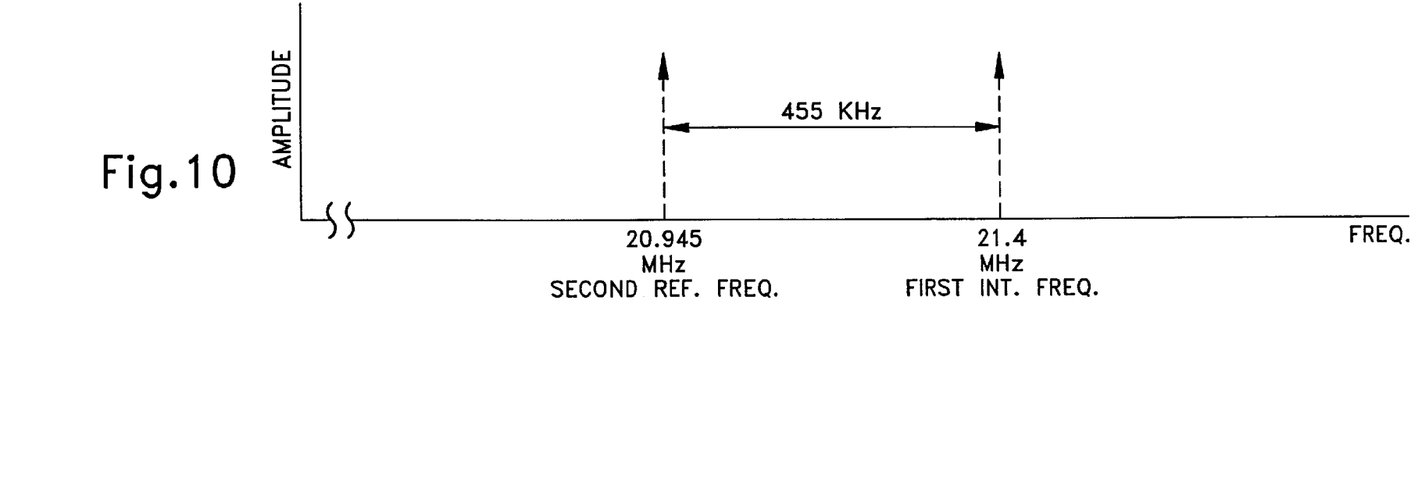
FIG. 10 is a plot illustrating another exemplary frequency plan for the second embodiment of the receiver unit.

The output signal 220 (FIG. 9) of the first mixer 218 is provided to an intermediate frequency filter 222 of a first intermediate detector 224. The intermediate frequency filter 222 is a bandpass filter having a center frequency at the difference frequency. Preferably, the center frequency is 21.4 MHz (FIG. 10). The output 226 (FIG. 9) of the intermediate frequency filter 222 is provided to an intermediate frequency amplifier 228.

The output 230 of the intermediate frequency amplifier 228 is provided as a first input to a second mixer 232. A second input 234 to the second mixer 232 is provided from a second reference oscillator 236. The second reference oscillator 236 preferably provides its oscillating output signal at 20.945 MHz (FIG. 10). The second mixer 232 outputs a signal 240 having sum and difference frequency components. Specifically, in the preferred embodiment, the "difference" frequency is 455 kHz and the "sum" frequency is 42.345 MHz.

The output signal 240 (FIG. 9) of the second mixer 232 is supplied to an intermediate frequency filter 244 of a second intermediate frequency detector 246. The intermediate frequency filter 244 is a bandpass filter having a centered frequency located at the "difference" or intermediate frequency (e.g., 455 kHz). Thus, the "sum" frequency component of the signal 240 does not pass through the intermediate frequency filter 244.

The output 248 of the intermediate frequency filter 244 is supplied to an intermediate frequency amplifier 250. The output 252 of the intermediate frequency amplifier 250 is provided to an ASK detector 254. The ASK detector 254 outputs a serial digital data signal 256, which contains the received complete message package. Thus, the embodiment of the receiver unit 18B shown in FIG. 9 is responsive to a gated oscillating signal 16 having a transmission frequency which is at either the first frequency or the second frequency.

If, per chance, the remote transmitter 14 is located in an area with which results in a "dead spot" for one of the frequencies, the receiver unit is still likely to receive a complete message, via the other frequency. Also, the actuation controller 20 is capable of discerning a complete message package if one part of the complete message package is received via one of the transmission frequencies and the complement part of the complete message package is received via the other transmission frequency. The actuation controller 20 "constructs" the complete message package from the parts.

Specifically, in the situation where each of the two message packages (one via the first frequency and the other via the second frequency) has missing data bits, the two message packages are "overlaid". Because the two message packages should be identical, most of the "overlaid" data bits will match (e.g., as determined by Boolean logic AND operation).

Accordingly, these matching data bits are used in the constructed message package. When one message package is missing a data bit, the corresponding data bit from the other message package is used in the constructed message package (e.g., as determined by Boolean logic XOR operation). If each data bit is present in at least one of the two message packages, then the constructed message can be completed.

From the above description of the invention, those skilled in the art will perceive improvements, changes and modifications. Such improvements, changes and modifications within the skill of the art are intended to be covered by the appended claims.

What is claimed is:

1. A remote convenience system for remote controlling performance of a function, said system comprising:

portable transmitter means for remote control requests, said transmitter means including means for providing a message that contains a function request, means for transmitting a first signal containing the complete message using a first frequency, and means for transmitting a second signal containing the same message using a second frequency, said second frequency being different from said first frequency; and receiver/controller means for receiving said remote control requests and for controlling performance of the requested function, said receiver/controller means including means for receiving a portion of the first signal, means for receiving a portion of the second signal and means for discerning the message from a combination of a portion of the first signal and a portion of the second signal.

2. A method of remote controlling performance of a function with a system having portable transmitter means for remote control requests and receiver/controller means for receiving remote control requests, said method comprising:

providing a message in the transmitter means that contains a function request;

transmitting a first signal containing the message using a first frequency;

transmitting a second signal containing the same message using a second frequency, the second frequency being different from the first frequency;

receiving a portion of the first signal and a portion of the second signal with the receiver/controller means; and discerning the message from a combination of the received portion of the first signal and the received portion of the second signal.

* * * * *